L. MAYER.
VEHICLE RUNNING GEAR.
APPLICATION FILED MAY 5, 1910.

1,073,265.

Patented Sept. 16, 1913.
2 SHEETS—SHEET 1.

Witnesses:
W. H. Scuba
E. C. Skinkle

Inventor
Louis Mayer.
By his Attorneys;
Williamson Merchant

L. MAYER.
VEHICLE RUNNING GEAR.
APPLICATION FILED MAY 5, 1910.

1,073,265.

Patented Sept. 16, 1913.

2 SHEETS—SHEET 2.

Witnesses:
E. C. Skinkle
Harry Opsahl

Inventor:
Louis Mayer
By his Attorneys:
Williamson & Merchant

UNITED STATES PATENT OFFICE.

LOUIS MAYER, OF MANKATO, MINNESOTA.

VEHICLE RUNNING-GEAR.

1,073,265.   Specification of Letters Patent.   Patented Sept. 16, 1913.

Application filed May 5, 1910. Serial No. 559,543.

*To all whom it may concern:*

Be it known that I, LOUIS MAYER, a citizen of the United States, residing at Mankato, in the county of Blue Earth and State of Minnesota, have invented certain new and useful Improvements in Vehicle Running-Gears; and I do hereby declare the following to be a full, clear, and exact description of the invention, such as will enable others skilled in the art to which it appertains to make and use the same.

My invention has for its object to provide an improved running gear for automobiles or motor propelled vehicles and, to this end, it consists of the novel devices and combinations of devices hereinafter described and defined in the claims.

In my improved running gear, all four wheels of the vehicle are positively driven from the motor and all are connected for steering movements. The steering mechanism is arranged to keep the transversely opposite wheels parallel and to impart reverse angular movements to the front and to the rear wheels so that, in turning a curve, the rear wheels will travel on the same arc as the front wheels on the same side of the vehicle.

The driving mechanism from the motor to the four wheels of the vehicle connects the front and rear wheels that are on the same side of the vehicle for movement at the same rate of speed; but a differential or compensating gear is arranged to permit the wheels on the one side of the vehicle to travel at a higher rate of speed than those on the other side, as required in turning curves.

The invention is illustrated in the accompanying drawings, wherein like characters indicate like parts throughout the several views.

Figure 1:
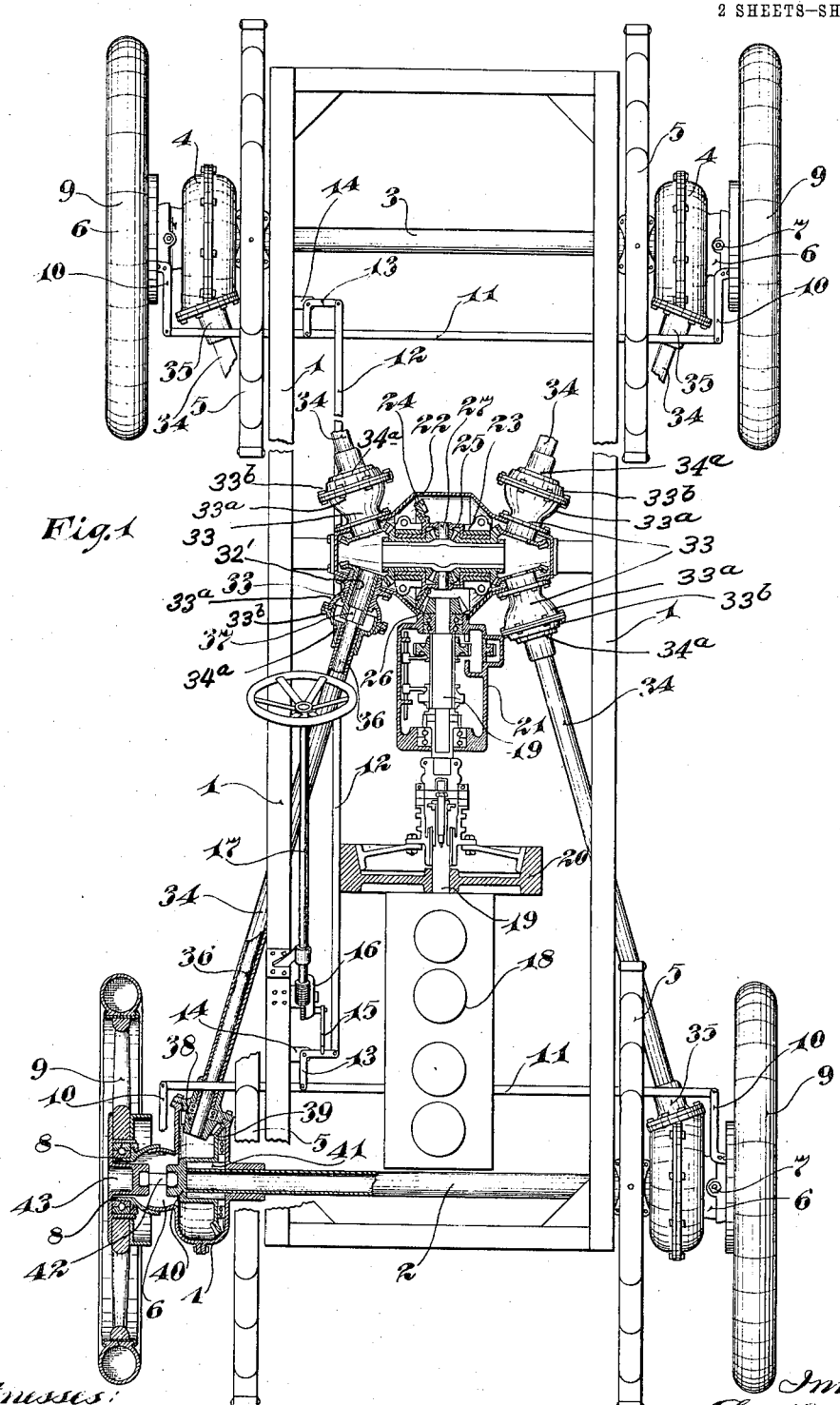
Figure 2:
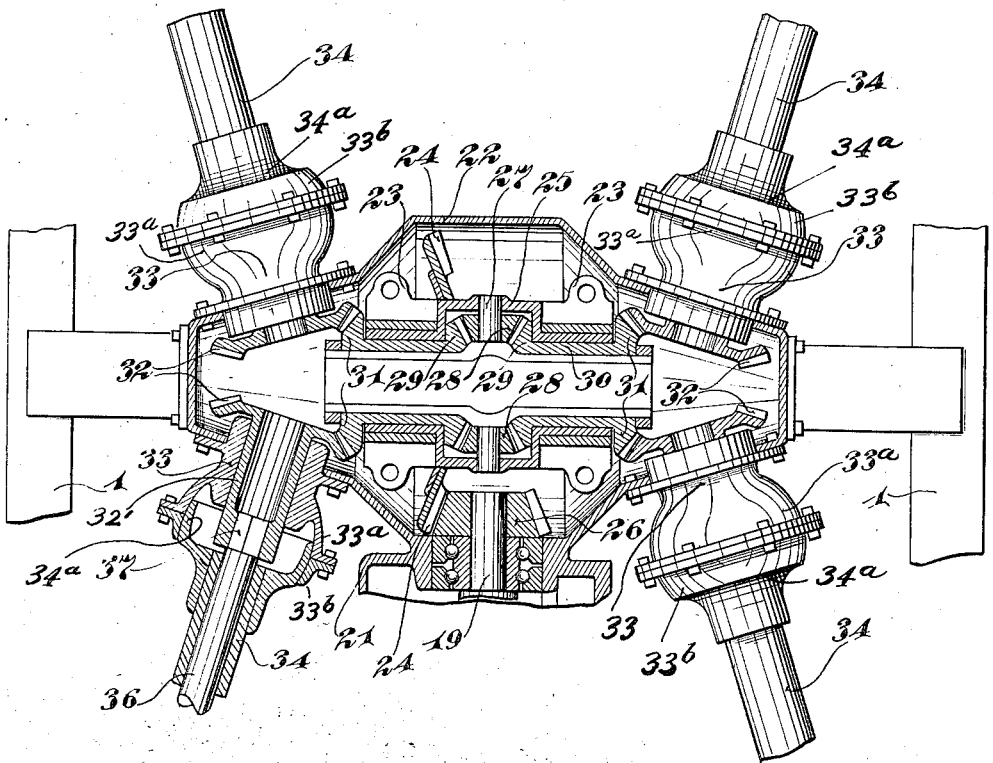

Referring to the drawings, Figure 1 is a view, chiefly in plan but with some parts in horizontal section and some parts broken away, showing the running gear of a vehicle such as an automobile, having my invention incorporated therein; and Fig. 2 is a view chiefly in horizontal section but with some parts in full, showing the compensating gear and driving connections thereto and therefrom, on a larger scale than shown in Fig. 1.

The numeral 1 indicates a rectangular truck frame to which hollow front and rear axles 2 and 3 are rigidly secured. Rigidly secured to the ends of both axles 2 and 3 are gear cases 4, to the hubs of which, as shown, elliptical springs 5 are secured. These springs 5 will carry the vehicle body not shown. The gear cases 4, at their outer portions, are provided with heavy segmental knuckle boxes 6, the top and bottom portions of which are flat and are pivotally connected by bolts or screws 7 to correspondingly formed boxes or flanges of wheel trunnions 8.

The wheels 9 are journaled on the wheel trunnions 8 in any suitable way. Preferably, the wheels 9 are of the construction disclosed and claimed in my co-pending application, filed of date May 5, 1910, under Serial Number 559,542, entitled "Improved wheel and journal," and the construction of the connection between the gear case and wheel trunnion and the connection between the wheel and the driving gear is preferably of the form disclosed and claimed in my co-pending application filed of date May 5, 1910, under Serial Number 559,544, entitled "Knuckle connection and drive for vehicle wheels."

For imparting steering movements to the four wheels in the manner above indicated, the box flanges of the wheel trunnions 8 are provided with rigidly secured projecting arms 10, those of the transversely opposite wheels being connected by tie bars 11. A thrust bar 12 is connected, at its ends, to the two tie bars 11, by bell cranks 13, shown as pivoted to suitable supports 14 on the frame 1. One of the bell cranks 13 is connected by a short link 15 to a steering head 16 which is subject to the screw-equipped shaft or spindle 17. The said parts 15, 16 and 17 may be of the customary or any suitable construction, and for the purposes of this case need not further be considered. It will be noted, however, that the steering connections just described are such that parallel steering movements will be imparted to the transversely opposite wheels and equal angular movements in reverse directions will be imparted to the front and rear wheels, so that the front and rear wheels, on the same side of the machine, will travel the same arc, or, in other words, will be self-trailing.

In the drawings, the motor employed is assumed to be an explosive engine 18 which is diagrammatically indicated and will be suitably supported from the frame 1. The shaft 19 of this engine is shown as provided with the customary fly wheel 20 and is operated through a reversing gear which may be of any suitable construction and is shown only in part in the drawings, being indicated as an entirety by the numeral 21.

Rigidly secured to the frame 1, approximately at the center thereof, is a gear case 22 provided with internal bearings 23. Working within the gear case 22 is a beveled gear 24 secured to a quite large sleeve 25, the reduced ends of which are journaled in the bearings 23. The gear 24 meshes with a pinion 26 secured on the adjacent end of the engine shaft 19. The enlarged central portion of the sleeve 25 has a multiplicity of inwardly extended pins 27, on which are journaled beveled compensating pinions 28. The opposite sides of these pinions 28 mesh with reversely beveled gears 29 formed on the inner ends of sleeves 30 journaled in the reduced portions of the sleeve 25 and provided, at their outer ends, with beveled gears 31. The parts 25 to 31, inclusive, make up the differential or compensating gear, in which the gears 31 are adapted to be differentially driven.

Each gear 31 meshes with a pair of oppositely beveled gears 32 having sleeve-like hubs 32′ which are journaled in supplemental gear cases 33 rigidly secured to the main gear case 22. The outer ends of the supplemental gear casings 33 terminate in half sockets 33ª, each thereof having a detachable ring section 33ᵇ. Tubular shaft casings 34 are detachably secured at their outer ends to bearing sleeves 35 on the gear case 4 and have rigidly secured at their inner ends half sockets 34ª which fit within the half sockets 33ª—33ᵇ and form a sort of ball and socket joint between the supplemental gear cases 33 and the shaft casings 34. Journaled in these tubes 34 are driving shafts 36 that radiate or extend at angles to each other from the gear case 22. The inner ends of the shafts 36 are made angular at 37 and are loosely engaged with correspondingly formed seats in the sleeve-like hubs 32′ of the respective gears 32. The outer ends of said shafts 36 are provided with rigidly secured beveled pinions 38 that mesh with beveled gears 39 provided with deeply recessed hubs 40 journaled on the projecting ends of the fixed axles 2 and 3, bearing rollers 41 being, as shown, employed in the said journals.

The projecting portions of the gear hubs 40 are formed with angular seats that are engaged with the angular inner heads with short driving knuckles 42. The outer angular ends of the driving knuckles 42 are engaged with angular seats formed in flanged hubs 43 rigidly secured to the respective wheels 9. The longitudinal centers of the driving knuckles 42 are approximately coincident with the axes of the corresponding pivotal connections between the gear cases 4 and the wheel trunnions 8, and, hence, are adapted to transmit the driving force to the wheels under all positions of the wheels.

With the mechanism illustrated in the drawings and described, it is evident that the above noted objects of the invention and the above stated functions are effectually carried out. The greatest possible efficiency in traction is afforded as well as a very desirable steering action which gives the operator complete control of the machine and renders the slipping of any one wheel ineffective to produce a slowing action of the machine. Generally stated, the invention makes possible a machine of the highest possible efficiency.

What I claim is:

1. In a vehicle running gear, the combination with four wheels, of a motor carried by the vehicle, a differential gear mechanism having a sectional driving shaft driven from said motor and provided, at its ends, with bevel gears, a casing for said differential gear mechanism, flexibly jointed shaft casings carried by the casing for said differential gear mechanism, and flexibly jointed shafts mounted in said shaft casings and having, at their inner ends, bevel gears meshing with the bevel gears of said differential gear mechanism and having, at their outer ends, gear connections to the wheels of said vehicle, substantially as described.

2. In a vehicle running gear, the combination with four wheels, of a motor carried by the vehicle, and a differential gear mechanism having a sleeve, a beveled gear driven from said motor and rigidly secured to the intermediate portion of said sleeve and axially alined therewith, and which sleeve has its ends reduced and mounted in bearings, a two part shaft journaled in the reduced ends of said sleeve and provided at its ends with beveled gears, beveled pinions mounted in the intermediate portion of said sleeve and meshing with the beveled gears on the inner ends of said two part shaft, driving shafts extending forwardly and rearwardly at an angle to each other and provided at their inner ends with beveled gears meshing with the beveled gears of said differential gear mechanism, said shafts at their outer ends having gear connections to the wheels of the vehicle, substantially as described.

In testimony whereof I affix my signature in presence of two witnesses.

LOUIS MAYER.

Witnesses:
ALICE V. SWANSON,
HARRY D. KILGORE.